(12) United States Patent
Fenn et al.

(10) Patent No.: US 6,336,536 B1
(45) Date of Patent: Jan. 8, 2002

(54) REVERSING VALVE WITH A PASSAGE WHICH IS DEPENDENT ON THE DIRECTION OF FLOW

(75) Inventors: Gerald Fenn, Pfersdorf; Hassan Asadi, Schweinfurt; Hans Luksch, Kirchlauter, all of (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/578,657

(22) Filed: May 25, 2000

(30) Foreign Application Priority Data

May 27, 1999 (DE) .......................................... 199 23 927

(51) Int. Cl.$^7$ ................................................. F16F 9/34
(52) U.S. Cl. .................................. 188/282.6; 188/322.15
(58) Field of Search ................................ 267/160, 161, 267/162; 188/322.15, 322.22

(56) References Cited

U.S. PATENT DOCUMENTS

| | | | | |
|---|---|---|---|---|
| 5,261,448 A | | 11/1993 | Furuya et al. ............ | 137/513.5 |
| 5,316,113 A | * | 5/1994 | Yamaoka ............... | 188/322.15 |
| 5,730,263 A | * | 3/1998 | Grundei et al. ......... | 188/322.15 |
| 5,785,160 A | * | 7/1998 | Grundei ................. | 188/322.15 |
| 5,937,976 A | * | 8/1999 | Grundei ................. | 188/322.15 |
| 5,971,117 A | * | 10/1999 | Grundei et al. ......... | 188/322.15 |
| 6,079,440 A | * | 6/2000 | Fenn et al. ............. | 188/322.15 |
| 6,116,388 A | * | 9/2000 | Bataille et al. ......... | 188/322.15 |

FOREIGN PATENT DOCUMENTS

| | | | |
|---|---|---|---|
| DE | 1 500 015 | 5/1969 | |
| DE | 40 25 115 | 2/1992 | ............. F16F/9/34 |

* cited by examiner

*Primary Examiner*—Christopher P. Schwartz
(74) *Attorney, Agent, or Firm*—Cohen, Pontani, Lieberman & Pavane

(57) ABSTRACT

Disclosed is a vibration damper with a damping valve having a reversing valve. The reversing valve has valve body having at least one passage opening with a cross section therein; a valve plate at least partially covering the passage opening and a reversing plate having at least one meandering shaped recess in the vicinity of the cover surface, and a circumferential section, wherein the recess has a starting point and an end point which bound the circumferential section the reversing plate is adapted to control the cross section of the passage opening as a function of flow direction. The valve includes a spring section extending in a circumferential direction and having at least one cover surface and a clamping surface which prestresses the reversing plate outside of the spring section and clamping surface against the reversing valve. The cover surface is aligned with the passage opening, and the circumferential section bounds the spring section.

16 Claims, 7 Drawing Sheets

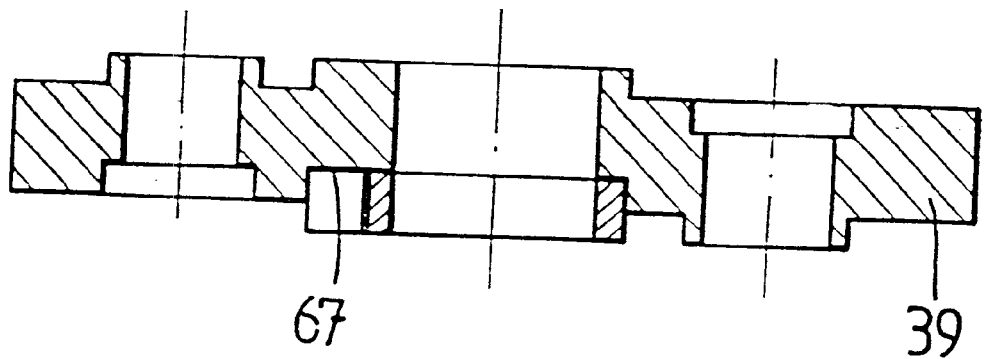
Fig.6
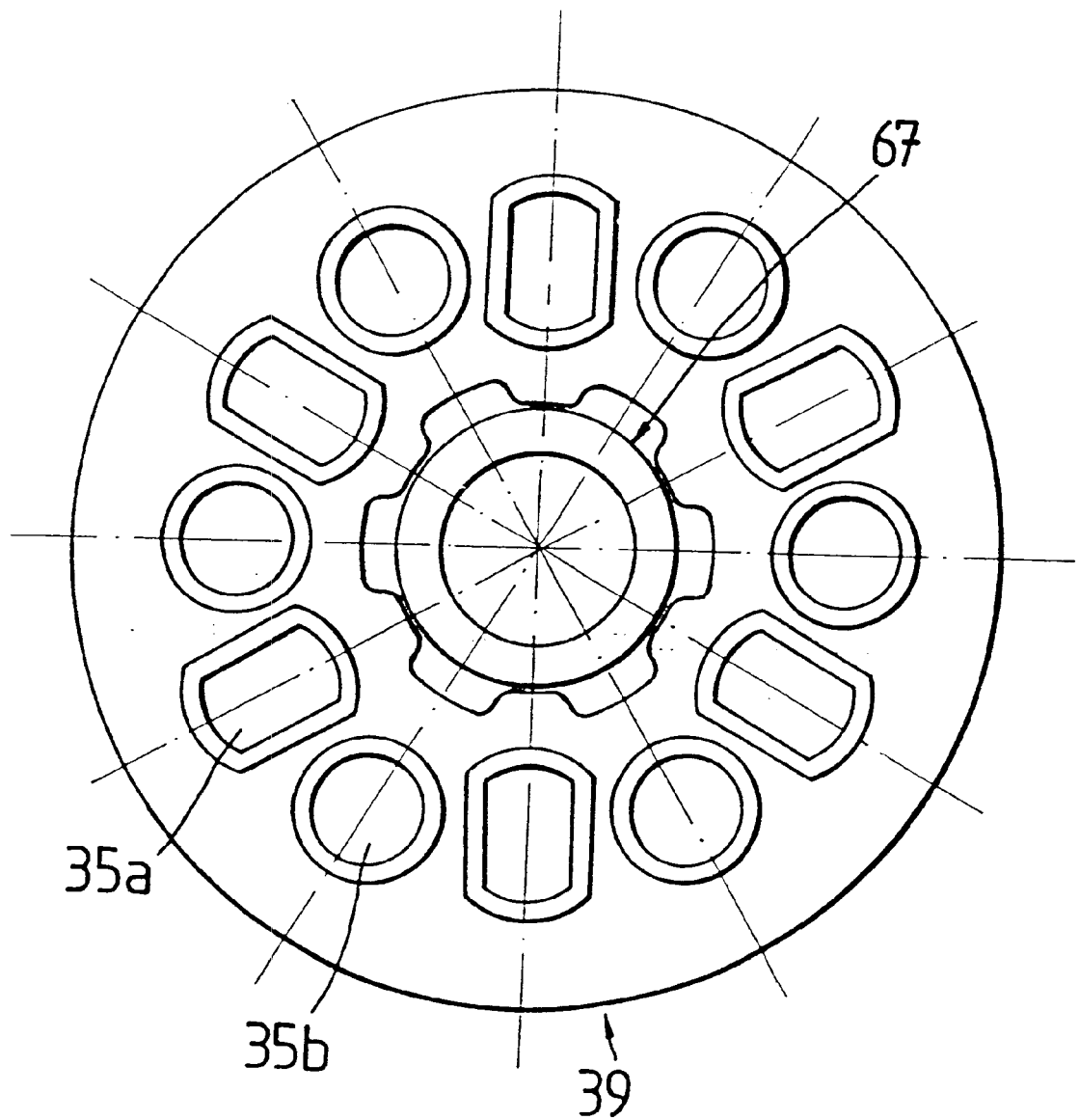

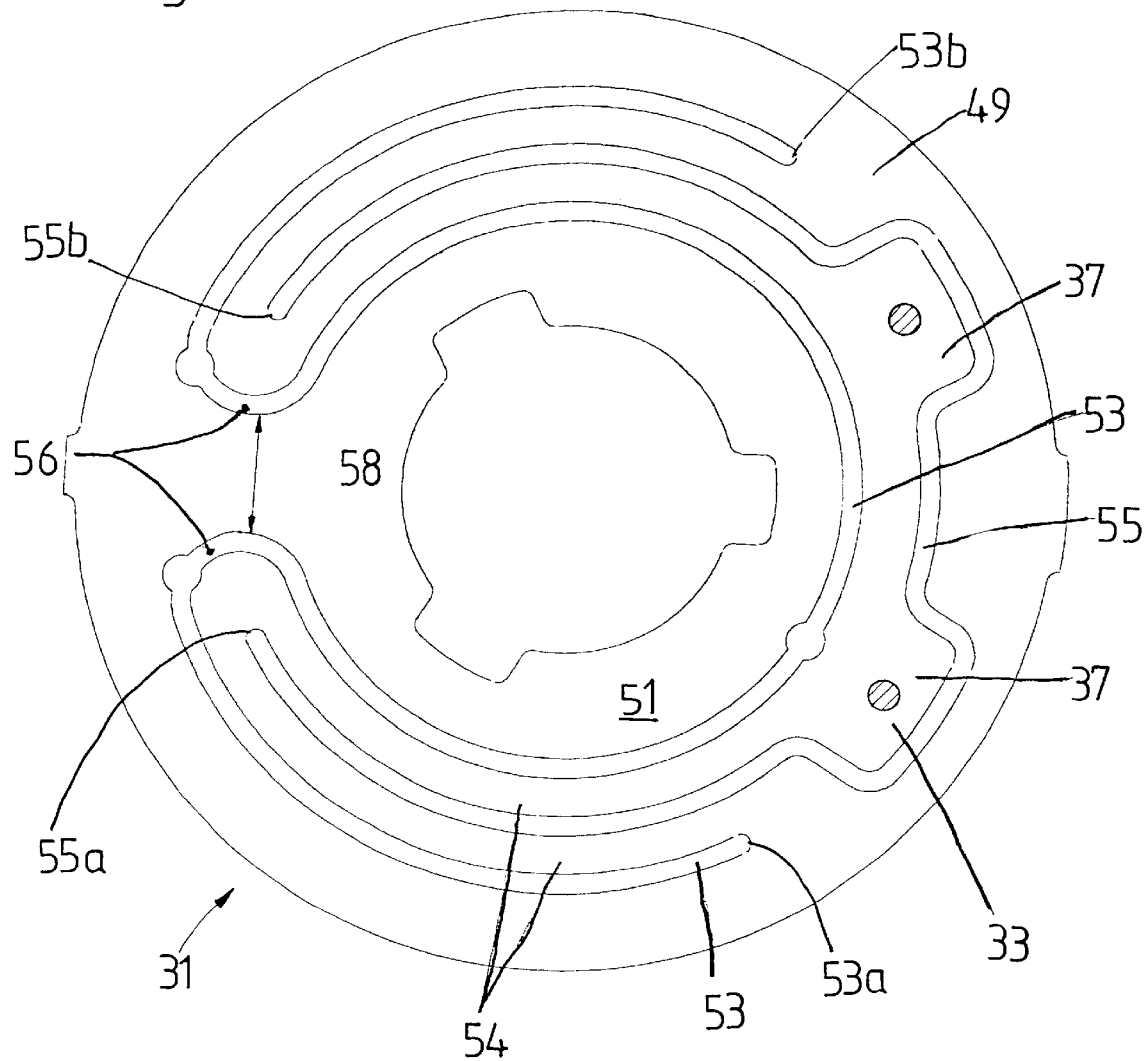

REVERSING VALVE WITH A PASSAGE WHICH IS DEPENDENT ON THE DIRECTION OF FLOW

BACKGROUND OF THE INVENTION

The invention relates to a reversing valve.

DE 40 25 115 A1 describes a damping valve having a damping valve body, elevated damping valve body regions being formed which emerge from a damping valve base body and which form valve bearing surfaces, having passage ducts which are covered by valve plates, at least one annular valve plate being arranged on the valve bearing surfaces and having at least one pre-opening cross section which is congruent with a passage duct, the pre-opening cross section being covered by a reversing plate which, when subjected to a flow from the passage duct, can lift off from the valve plate in the axial direction of the valve body. This theoretically good design of a direction-dependent pre-opening cross section has, however, the disadvantage that if the reversing plate is suddenly subjected to a flow a lifting-off movement is carried out which is so rapid that it brings the reversing plate to bear against the above arranged valve plate. The problem arises of how to counteract the sticking of the reversing plate at the valve plate without possible spring forces excessively influencing the opening characteristics of the reversing plate. The sticking effect cannot occur in the embodiment variant according to FIG. 1 of DE 40 25 115 A1, but the deformation forces which are necessary to allow the reversing plate to lift off are clearly discernible.

U.S. Pat. No. 5,261,448 describes a reversing valve having a valve body which separates two working spaces which are filled with a fluid. The valve body has passage openings which are covered at least partially by a number of valve plates. The passage cross section of the passage openings is controlled by a reversing plate as a function of the direction of flow. The reversing plate has spring sections which extend in the circumferential direction. The valve has at least one cover surface and clamping surfaces which the reversing plate prestresses outside the cover surfaces and the spring elements against the reversing valve. The at least one cover surface is aligned with at least one passage opening. The limited spring section is deformed in the transverse direction so that a small spring rate is obtained if the spring section is made as narrow as possible in the circumferential direction, which, however, conflicts with the need for rigidity.

SUMMARY OF THE INVENTION

The object of the present invention is to provide a reversing valve with a throttle passage which is effective as a function of direction, in such a way that the switching movement of the valve elements which clear the throttle cross section can proceed with minimum forces, while ensuring a secure closure to the other direction of pressure.

It is a further object to obtain reliable operating characteristics and the highest possible degree of fatigue strength.

According to the invention, the reliable operating characteristics are achieved in that the reversing plate has a recess which has a meandering shape in the vicinity of the cover surfaces.

The meandering configuration of the recess enables the cover surface to be made as small as possible. A small cover surface results in lower adhesive forces at the valve so that the dispersion of forces due to the adhesive forces is reduced.

In the invention, increased rigidity is obtained in that independently of, or in combination with the means of obtaining the reliable operating characteristics, two recesses are formed, one of which is concentric with respect to the center point of the reversing plate and is at least semi-helical over one longitudinal section, the inner recess being made in the surface region which is enclosed by the semi-helical longitudinal section of the recess, with the result that at least three concentric recesses extend over a circumferential section and bound the spring section.

This construction provides two advantages. Firstly, only three pitch circles are required for the recesses. A larger cross-sectional region is thus available for the inner and outer clamping surfaces. Furthermore, particularly long spring sections, which reduce the flow pressure necessary to lift off the cover surfaces, are obtained.

According to a further advantageous embodiment, the recesses are symmetrical with respect to at least one connecting web between the outer clamping surface and the inner clamping surface. Here, the connecting web is oriented diametrically with respect to the cover surfaces. The connecting web also provides an advantage in terms of rigidity, because the stresses which occur within the reversing plate when the cover surface lifts off are better absorbed.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

FIG. 6 shows an alternative embodiment of a reversing plate; and

FIG. 7 shows a further reversing plate as an individual component.

DETAILED DESCRIPTION OF THE PRESENTLY PREFERRED EMBODIMENTS

Figure 1:
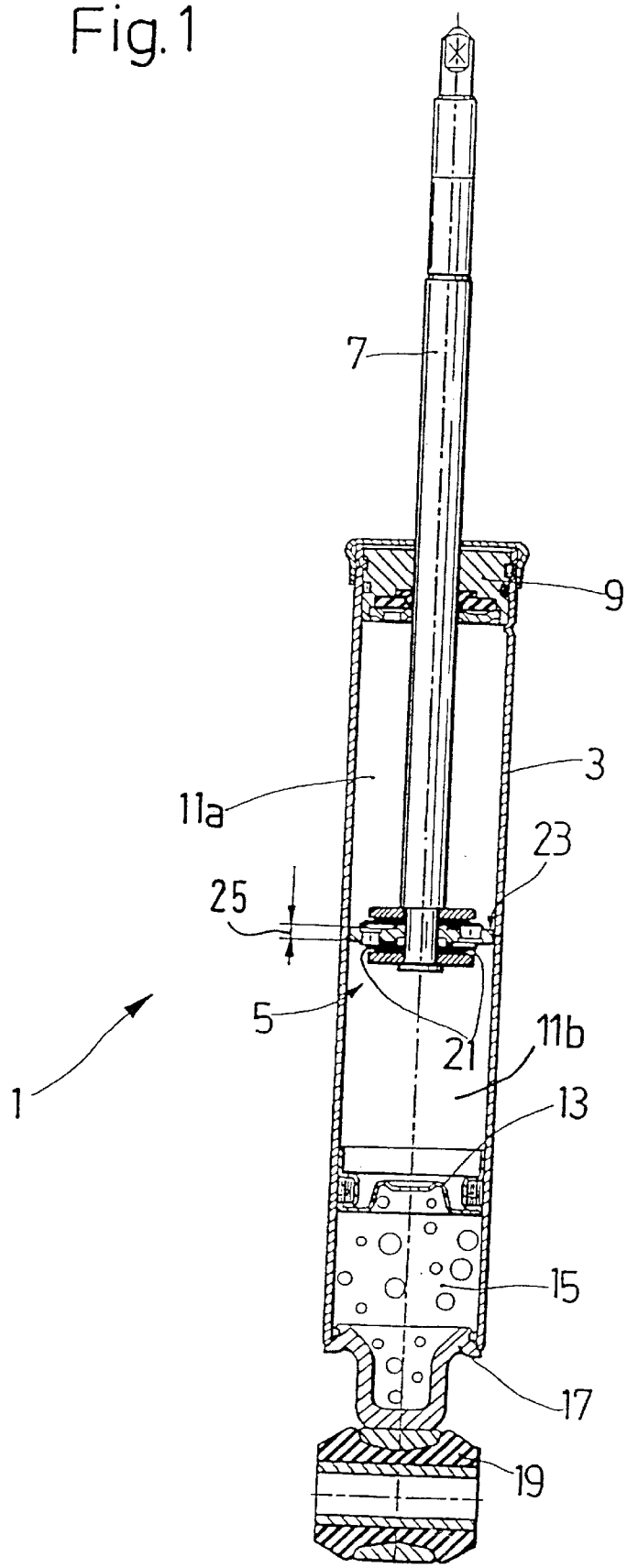
FIG. 1 shows an exemplary embodiment of a vibration damper of the invention.

FIG. 1 shows by way of example a piston cylinder assembly 1 in the embodiment of a single-tube vibration damper. Basically, the invention can also be used in other piston cylinder assemblies such as pneumatic springs or the like.

The single-tube vibration damper 1 is composed essentially of a pressure tube 3 in which a piston 5 is arranged in an axially movable fashion on a piston rod 7. On the outlet side of the piston rod 7, a piston rod guide 9 closes off a working space 11 which is filled with damping agent and which is separated by a separating piston 13 from a gas space 15 which has a base 17 with an eyelet 19 at the end.

When the piston rod moves, damping agent is forced through damping valve 21 in the piston 5. A piston ring 23, which covers a circumferential surface 25 of the piston 5, prevents a lateral flow around the piston.

Figure 2:
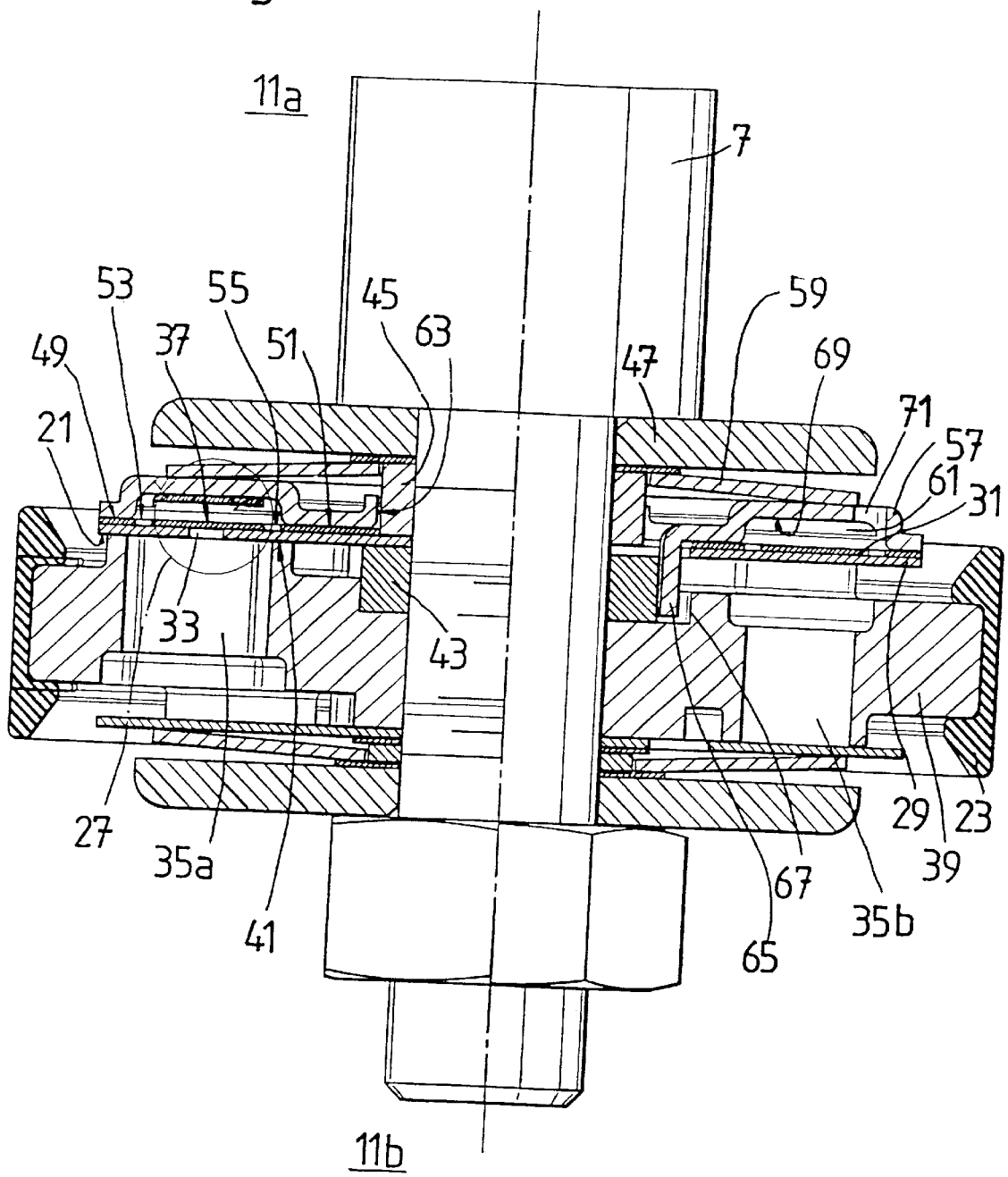
FIG. 2 shows a valve body in detail.

FIG. 2 shows the piston 5 of the vibration damper 1 as an individual component with a reversing valve 27 according to the invention, which is composed in this embodiment of a throttle plate 29 in conjunction with a reversing plate 31. In the throttle plate there is at least one throttle cross section 33 oriented to a passage opening 35, the throttle cross section or cross sections being covered by a cover surface 37 of the reversing plate 31. Basically, the invention can also be transferred to a base valve of a vibration damper or to another application.

The reversing valve 27 is part of the damping valve 21 in the piston 5 of the vibration damper which has a valve body 39 which connects the two working spaces 11a and 11b via the passage openings 35a and 35b. The passage openings open out of valve bearing surfaces 41 on which the throttle plate bears in its external region. At the radially internal region, a bearing ring 43 is introduced or pressed into the valve body, and its bearing surface lies exactly in one plane with the valve bearing surface 41, so that the throttle plate is planar over its entire surface. The centering of the throttle plate is carried out by means of the internal diameter on a journal of the piston rod 7. If appropriate, the bearing ring 43 is worked together with the valve bearing surface 41 in a common operation to the envisaged height. The throttle plate can deform elastically, the external region which bears on the valve bearing surfaces being able to lift off, whereas the internal region is secured to the piston rod journal by means of a clamping ring 45 in conjunction with a stop plate 47.

The reversing plate which bears on the throttle plate 29 has internal and external clamping surfaces 49 and 51 radially inside and outside the cover surface 37. The clamping surfaces 49 and 51 each are separated by recesses 53 and 55, as a result of which the cover surface can lift off from the valve bearing surface in the axial direction of the valve body. To center the reversing plate, use is made of its internal diameter which also acts on the clamping ring 45.

The lifting-off movement of the cover surface of the reversing plate is bounded by a securing plate 57 which is laid on the clamping surfaces 49 and 51, the securing plate 57 being in turn prestressed by a spring element 59, which may be a disk spring. At least in the vicinity of the cover surface 37 of the reversing plate 31, the securing plate 57 has a channel 61 which makes available the necessary free space for the lifting-off movement of the cover surface (see left-hand half of section). Guide segments 63 are formed as a radial guide on the internal diameter of the securing plate in the direction of the stop plate 47. Positively locking segments 65, which engage through the reversing plate and the throttle plate and in a counterprofile 67 of the valve body which is matched to the connection segments are made in the other direction.

The base 69 of the channel 61 is provided with flow connections 71 which connect the channel to the upper working space 11a. The flow connections lie outside the surface of the spring element 59.

When there is a flow of damping agent out of the working space 11b through the passage openings 35a and against the reversing valve 27, the throttle plate is subjected to pressure over the cross section of the passage openings. Low pressure forces cannot lift off the throttle plate from the valve bearing surfaces counter to the force of the spring element 59. In these cases, only the cover surface 37 of the reversing plate, which is loaded on the cross section of the preopenings 33, is lifted off from the throttle plate so that damping agent can flow into the channel 61 and on into the working space 11a through the flow connections 71.

If larger pressure forces occur, the throttle plate lifts off in the vicinity of the bearing surfaces, as a result of which the damping valve 21 is active. The reversing plate and the securing plate are also lifted off. When the direction of flow is reversed, the cover surface is pressed onto the throttle plate by the pressure in the channel 61, so that the damping agent can only flow into the working space 11b through the passage openings 35b.

Figure 3:
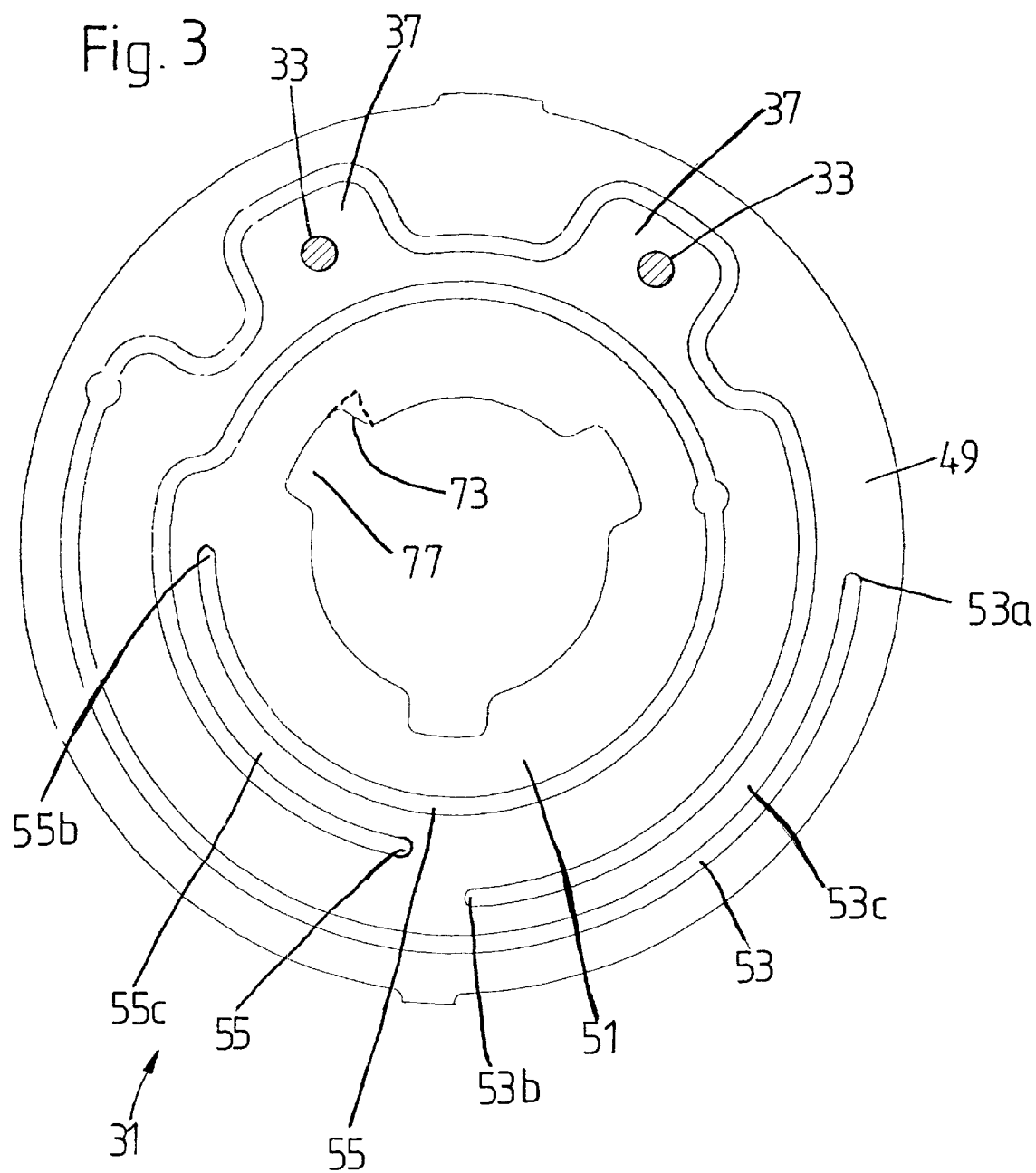
FIG. 3 shows a reversing plate as an individual component.

FIG. 3 illustrates the reversing plate 31 as an individual component. The reversing plate has a first external recess 53 which is implemented in a spiral shape over an angle of approximately 45°. Between its starting point 53a and its end point 53b, the spiral-shaped recess forms a spring section 53c which extends in the circumferential direction and lies in the same plane position as the other surface parts of the reversing plate. The greater the distance between the starting point and end point in the circumferential direction, the longer the spring section, and thus the smaller the spring constant of the spring section.

The recess 55, which lies further toward the inside in the radial direction, is also spiral shaped and its circumferential angle is of a comparable or identical magnitude to the external recess 53. An internal spring section 55c, which extends in the circumferential direction is in turn formed between a starting point 55a and an end point 55b of the internal spiral-shaped recess. If the external and internal clamping surfaces 49 and 51, which each lie outside the spiral-shaped recesses, are imagined to be stationary with respect to the cover surface 37, the cover surface can lift off from the plane position, the spring sections deforming like leaf springs. As a result of the spring sections, a degree of prestress, if only low, of the cover surface with respect to the throttle plate is ensured at all times so that the cover surface is always moved back in the direction of the throttle plate and there is a defined closing characteristic.

The starting and end points of the spiral-shaped recesses 53 and 55 are combined in one half of the reversing plate so that a cover surface 37 which is as large as possible can be produced. The throttle cross sections 33 in the cover surface are illustrated for a better understanding.

To minimize the risk of the reversing plate 31 sticking on throttle plate 29, the spiral-shaped recess 53 has a meandering shape in the vicinity of the cover surface 37. The spiral-shaped recess 53 forms, as it were, a border around the throttle passages 33 of the throttle plate 29. A cover surface 37 which is as small as possible is obtained so that the adhesive forces which may possibly occur are also small.

Figure 4:
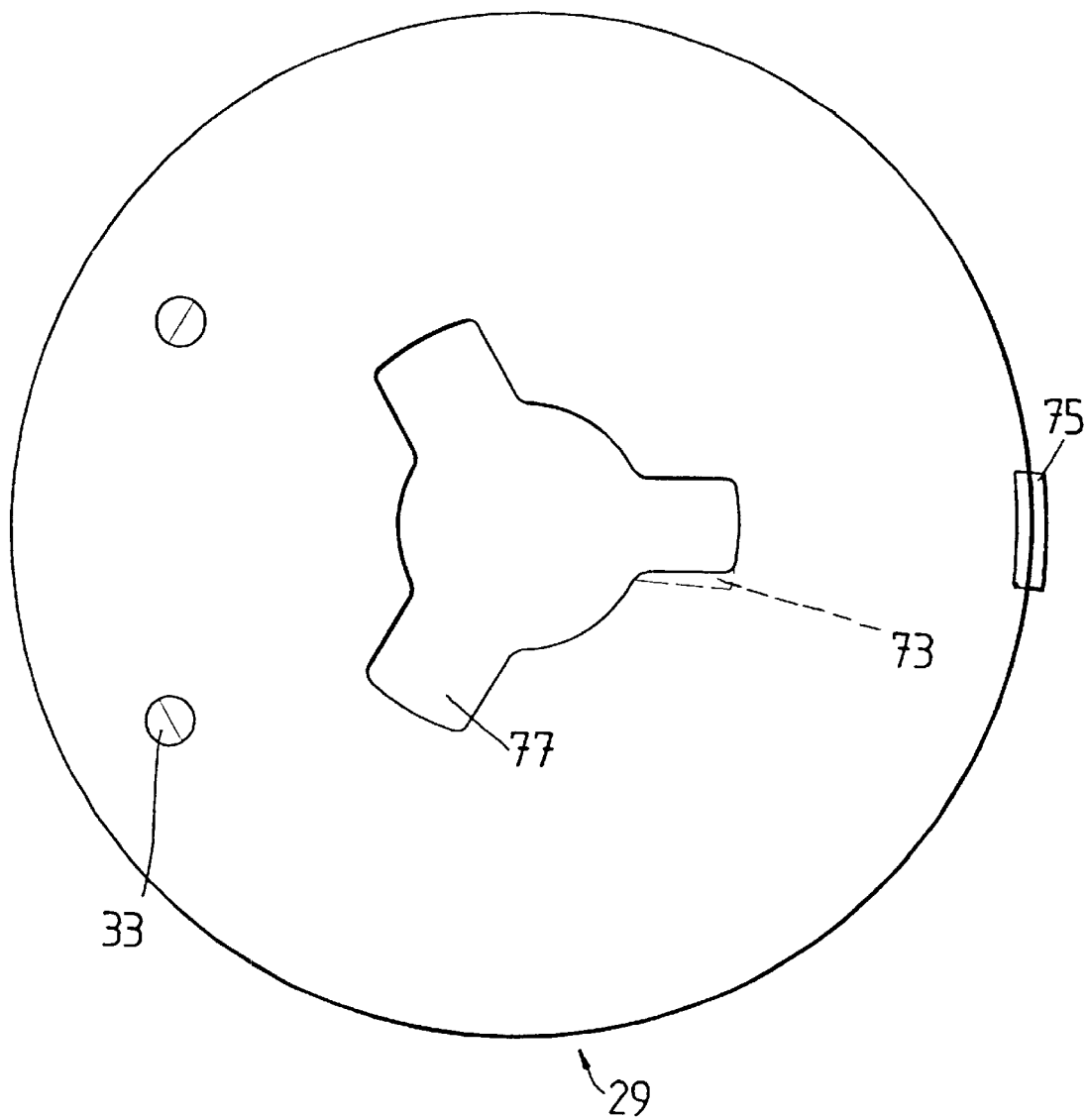
FIG. 4 shows a throttle plate as an individual component.

FIG. 4 shows the throttle plate as an individual component with its two throttle cross sections 33. So that the throttle plate is aligned with the throttle openings in the valve body 39, the internal diameter is of profiled design, a difference in profiling 73 being used. Moreover, the reversing plate is profiled in a way identical to the throttle plate. The profiling is of groove-like design, the throttle cross section 33 in the throttle plate 29 being aligned symmetrically with the profile part with the difference in profiling 73 in order to prevent the throttle cross sections being installed in the valve body in an incorrect position with respect to the passage openings 35a and 35b.

Figure 5:
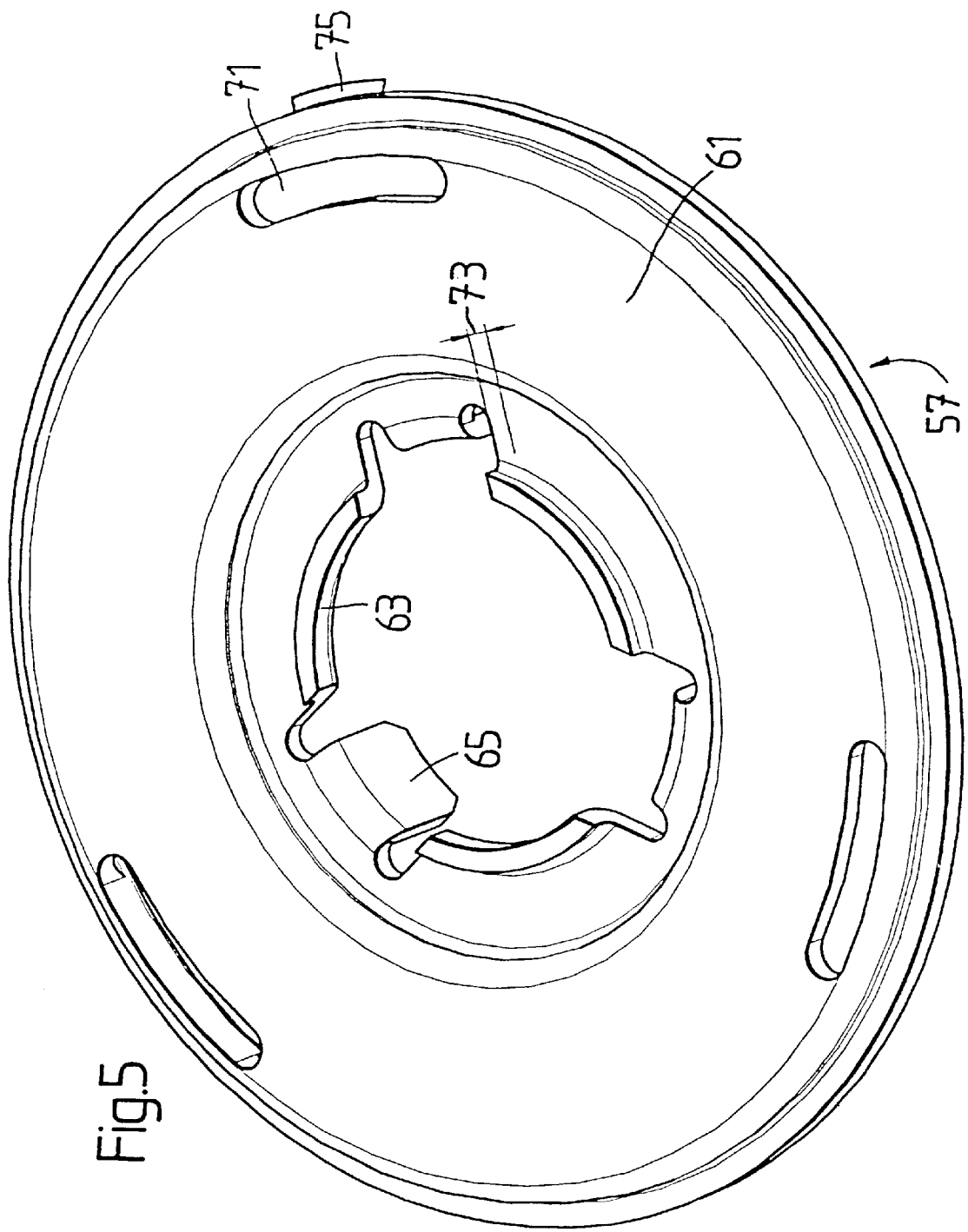
FIG. 5 shows a securing plate as an individual component.

FIG. 5 provides supplementary information on FIG. 2 and thus shows the securing plate 57, the positively locking segments 65 which engage through the reversing plate and the throttle plate being represented more clearly in this view. The difference in profiling 73 which has already been described is also present on the positively locking segments. Furthermore, it is apparent that the flow connections are slits made in the circumferential direction. The channel 61 is formed all around the circumference.

These plates may have notches 75 or similar markings which make it possible to detect the predetermined installation position so that during the assembly operation the threading in of the securing plate, of the reversing plate and of the throttle plate is simplified.

FIG. 6 illustrates the counterprofile 67 which undergoes a positively locking connection with the positively locking segments of the securing plate and orientates the entire disk arrangement.

In the case of relatively small passage openings 35a and 35b, it is possible, under certain circumstances, to dispense with a throttle plate if the internal or external recess of the reversing plate is located in the vicinity of the valve bearing surface. With its sickle-shaped overlap with the passage opening 35, the respective other recess then forms the throttle cross section 33, it being necessary to ensure that the reversing plate is not so elastic that when there is a flow from the direction of the working space 11a it is pressed into the passage opening by the flow pressure.

FIG. 7 shows a refinement of the reversing plate according to FIG. 3. Two recesses 53 and 55 are in turn used, which recesses 53 and 55 separating the outer and inner clamping surfaces 49 and 51 from the cover surface 37 and form spring sections. A structural difference is that an outer recess 53, which extends over certain parts in the circumferential direction, has a semi-helical longitudinal section 54 which bounds a surface region for a shaped recess 55, the outer recess also being c-shaped concentrically with respect to its inner recess and extending radially within the inner recess starting from the semi-helical section. The c-shape of the recesses 53 and 55 with the end points 53a, 53b, 55a, and 55b produces a connecting web 58 which is oriented diametrically with respect to the cover surfaces 37. The entirety of the recesses extends symmetrically with respect to the connecting web.

The inner recess 55 is fashioned with an appropriately meandering shape as in FIG. 3. With respect to spring sections with an optimum length, the ends 53a and 53b of the outer recesses 53 extend to near to the radially outer edge region of the cover surfaces 37 and of the correspondingly configured recesses 55.

As is apparent from the exemplary illustration, the recesses 53 and 55 are arranged on three concentric pitch circles. This produces an increase in area for the remaining outer clamping surface 49, which therefore has a higher degree of rigidity.

The terms and expressions which have been employed are used as terms of description and not of limitation, and there is no intention in the use of such terms and expressions of excluding any equivalent of the features shown and described or portions thereof, it being recognized that various modifications are possible within the scope of the invention.

We claim:

1. A reversing valve comprising:
   a valve body having at least one passage opening with a cross section therein;
   a valve plate at least partially covering said least one passage opening; and
   a reversing plate adapted to control the cross section of the least one passage opening as a function of flow direction, said reversing plate having at least one recess and a circumferential section, wherein the least one recess has a starting point and an end point which bound said circumferential section and a spring section extending in a circumferential direction and having at least one cover surface and a clamping surface which prestresses the reversing plate outside of the spring section and clamping surface against the reversing valve, the least one cover surface being aligned with the least one passage opening, said circumferential section bounding the spring section, wherein said least one recess has a meandering shape in the vicinity of the cover surface.

2. The reversing valve of claim 1, wherein said reversing plate has a center point and two recesses, a first recess of which is concentric with respect to the center point of the reversing plate and is at least semi-helical over one longitudinal section.

3. The reversing valve of claim 2, wherein a second recess is in a surface region which is enclosed by the semi-helical longitudinal section of the first recess, with the result that at least three concentric recesses extend over circumferential section and bound the spring section.

4. The reversing valve of claim 3, wherein the recesses are symmetrical with respect to at least one connecting web between an outer clamping surface and an inner clamping surface.

5. The reversing valve of claim 4, wherein the connecting web is oriented diametrically with respect to the cover surfaces.

6. The reversing plate of claim 1, wherein there is a securing plate on the clamping surface which is prestressed by a spring element.

7. The reversing plate of claim 6, wherein the securing plate has positively locking segments.

8. The reversing plate of claim 1, wherein said recess is implemented over an angle of approximately 45°.

9. The reversing valve of claim 1, wherein the reversing plate bears on a throttle plate.

10. A vibration damper comprising:
    a pressure tube;
    a piston on a rod axially disposed in said pressure tube wherein said piston has a reversing valve comprising a valve body having at least one passage opening with a cross section therein;
    a valve plate at least partially covering said least one passage opening; and
    a reversing plate having at least one recess and a circumferential section, wherein the least one recess has a starting point and an end point which bound said circumferential section and said reversing plate is adapted to control the cross section of the least one passage opening as a function of flow direction, said reversing plate having a spring section extending in a circumferential direction and having at least one cover surface and a clamping surface which prestresses the reversing plate outside of the spring section and clamping surface against the reversing valve, the least one cover surface being aligned with the least one passage opening, said circumferential section bounding the spring section, wherein said least one recess has a meandering shape in the vicinity of the cover surface.

11. A damping valve comprising:
    a reversing valve which comprises a valve body having at least one passage opening with a cross section therein;
    a valve plate at least partially covering said least one passage opening; and
    a reversing plate having at least one recess and a circumferential section, wherein the least one recess has a starting point and an end point which bound said circumferential section and said reversing plate is adapted to control the cross section of the least one passage opening as a function of flow direction, said reversing plate having a spring section extending in a circumferential direction and having at least one cover surface and a clamping surface which prestresses the reversing plate outside of the spring section and clamping surface against the reversing valve, the least one cover surface being aligned with the least one passage opening, said circumferential section bounding the spring section, wherein said least one recess has a meandering shape in the vicinity of the cover surface.

12. A reversing valve comprising:

a valve body having passage apertures formed therein and separating two working spaces;

a plurality of valve plates which at least partially mask the passage apertures;

a reversing plate which controls the average cross section of the passage apertures as a function of flow direction, said reversing plate having a spring section and at least one covering surface and one clamping surface that prestresses the reversing plate outside the least one covering surface and spring section on the reversing valve, the at least one covering surface being oriented toward at least one passage aperture;

the reversing plate having a center point and two recesses, the circumferential section of the reversing plate, which is limited by the start and finish points of the recesses, limiting the spring section, wherein a first recess is formed concentrically with the center point of the reversing plate and at least half coiled over a lengthwise section, the second recess being formed in a surface region enclosed by the half-coiled lengthwise section of the first recess, so that at least three concentric recesses extend over a circumferential surface and limit the spring section.

13. The reversing valve of claim 12 wherein the reversing plate has an outer tensioning surface and an inner tensioning surface and at least one connecting web therebetween.

14. The reversing valve of claim 13 wherein the two recesses are formed symmetrically relative to the least one connecting web.

15. The reversing valve of claim 13 wherein the connecting web is oriented diametrically to the least one covering surface.

16. The reversing valve of claim 12 wherein at least one of the recesses has a meandering shape in the region of the least one covering surface.

* * * * *